US006941131B2

United States Patent
Roderique

(10) Patent No.: US 6,941,131 B2
(45) Date of Patent: Sep. 6, 2005

(54) INCOMING CALL HANDLING METHOD FOR MOBILE COMMUNICATIONS DEVICE INCORPORATING MOBILE ASSISTED MESSAGING ON DEMAND

(75) Inventor: Benjamin O. Roderique, Bedford County, VA (US)

(73) Assignee: Ericsson Inc., Research Triangle Park, NC (US)

( * ) Notice: Subject to any disclaimer, the term of this patent is extended or adjusted under 35 U.S.C. 154(b) by 502 days.

(21) Appl. No.: 09/815,475

(22) Filed: Mar. 23, 2001

(65) Prior Publication Data

US 2002/0137503 A1 Sep. 26, 2002

(51) Int. Cl.[7] .............................. H04M 3/42; H04M 1/64
(52) U.S. Cl. .................... 455/417; 455/415; 455/412.1; 455/412.2; 455/413; 379/211.01; 379/88.22; 379/88.23
(58) Field of Search .................................. 455/417, 415, 455/412.2, 413, 418, 412.1, 456.5, 566, 567; 379/211.01, 211.02, 88.19, 88.2, 88.21, 88.22, 88.23

(56) References Cited

U.S. PATENT DOCUMENTS

| | | | | |
|---|---|---|---|---|
| 5,276,731 A | * | 1/1994 | Arbel et al. ............ | 379/211.02 |
| 5,327,486 A | | 7/1994 | Wolff et al. .................... | 379/96 |
| 5,548,636 A | * | 8/1996 | Bannister ................ | 379/390.01 |
| 5,559,860 A | * | 9/1996 | Mizikovsky ................ | 455/413 |
| 5,742,905 A | * | 4/1998 | Pepe et al. .................. | 455/461 |
| 5,999,611 A | * | 12/1999 | Tatchell et al. .............. | 379/211 |
| 6,018,671 A | * | 1/2000 | Bremer ........................ | 455/567 |
| 6,246,889 B1 | * | 6/2001 | Boltz et al. .................. | 455/567 |
| 6,574,471 B1 | * | 6/2003 | Rydbeck ...................... | 455/418 |
| 6,654,615 B1 | * | 11/2003 | Chow et al. ................. | 455/555 |
| 6,704,565 B1 | * | 3/2004 | Parsons et al. ........... | 455/414.1 |
| 6,768,789 B1 | * | 7/2004 | Wilk ........................ | 379/67.1 |

FOREIGN PATENT DOCUMENTS

| | | |
|---|---|---|
| JP | 0510411 A2 | 10/1992 |
| WO | WO 92/04798 | 3/1992 |
| WO | WO 99/39490 | 8/1999 |
| WO | WO 02/05527 | 1/2002 |

* cited by examiner

*Primary Examiner*—Duc M. Nguyen
(74) *Attorney, Agent, or Firm*—Coats & Bennett, P.L.L.C.

(57) ABSTRACT

A method of handling an incoming call during an operational mode of a wireless communications device is provided. With the operational mode activated, an incoming call is received at the wireless communications device on a control channel of the wireless communications system. The source of the incoming call is identified, typically by activating caller ID circuitry resident within the wireless communications device to identify a phone number of the source of the incoming call. One of a plurality of pre-recorded messages is then selected either manually or automatically to play back to the source of the incoming call. The plurality of pre-recorded messages are stored at a voice message mailbox in the wireless communications system allocated to the wireless communications device. The incoming call is then diverted, without completing the call and switching to a traffic channel, to the voice message mailbox of the wireless communications device and the selected pre-recorded messages is played back for the source of the incoming call.

16 Claims, 3 Drawing Sheets

| | ALPHA IDENTIFIER | PHONE NUMBER | MESSAGE |
|---|---|---|---|
| 46a | DAVE JONES | 555-555-1212 | 2 |
| 46b | JOHN DOE | 555-555-2121 | 1 |
| | ⋮ | ⋮ | ⋮ |
| 46n | BILL SMITH | 555-555-1111 | |

*FIG. 3*

INCOMING CALL HANDLING METHOD FOR MOBILE COMMUNICATIONS DEVICE INCORPORATING MOBILE ASSISTED MESSAGING ON DEMAND

FIELD OF THE INVENTION

The present invention is directed toward a method of handling an incoming call for a wireless communications device and, more particularly, toward a method of handling an incoming call for wireless communications device incorporating a messaging on demand feature.

BACKGROUND OF THE INVENTION

In today's society, the use of wireless communications devices is becoming more and more commonplace. Wireless communications devices permit a user to be contacted, and contact others, from almost any location on the Earth. Such wireless communications devices typically include, but are not limited to, analog and digital and cellular phones, pagers, wireless phone handsets, wireless communicators, personal computers and laptops equipped with wireless modems, Personal Digital Assistants (PDAs), Handheld Personal Computers (HPCs), and other wireless electronic devices. While the wireless progression has increased the ability of individuals to communicate with others since communication via wireless networks can be effectuated from almost any location on the Earth, there are times when a user of the wireless communications device is unavailable to take a call, or otherwise does not wish to be reached. However, even in these instances when a user is unavailable, he or she may wish to provide different individuals with different, unique messages. It is also desirable to provide this unique messaging feature in a manner most cost effective to the user.

Conventional wireless, or mobile, communications devices typically do not support such a unique messaging on demand feature. In conventional mobile communications devices, when a mobile user is unable to take a call, they will either ignore the ring, or hit the "NO" key to indicate that they are busy or otherwise unavailable. Hitting the "NO" key typically provides two responses to a caller of the incoming call. They will either get a carrier provided response that the user is unavailable, or they will be directed to voice mail where they may leave a message for the mobile user. Voice mail is provided by the wireless system carrier and typically allows for only one message to be pre-recorded by the mobile user that all callers directed to voice mail will hear.

One improvement in wireless messaging is found in International Publication No. WO 99/39490 entitled "Apparatus and Method for Handling Incoming Calls Received by a Portable Intelligent Communications Device During a Meeting". This application discloses an apparatus and method for handling incoming calls during an operational mode of a mobile communications device when a user is engaged in a meeting or otherwise unavailable. The mobile communications device includes a Graphical User Interface (GUI) which generates a variety of options on a display screen when an incoming call is received by the device when in the operational mode. A user of the mobile communications device manually activates one of the available options for handling of the incoming call.

While one of the options available to the user in International Publication No. WO 99/39490 is having a plurality of stored messages from which to choose for playing back to a caller of an incoming call, these voice messaging options are saved internal to the mobile communications device. This requires additional memory storage within the mobile communications device, which not only costs money but occupies valuable space within the wireless communications device. As wireless communications devices become smaller and smaller, as typically occurs with each new generation of cellular phone, the allotted space within the wireless communications device must continually be more efficiently utilized. Further, with the price pressures effecting the consumer market, the ability to add functionality to a mobile communications device without adding hardware and incurring additional costs is a key advantage.

Also, in order to use the voice messaging functions disclosed in International Publication No. WO 99/39490, the incoming call must first be completed. That is, the incoming call must be changed from a control channel, where the mobile user incurs no costs, to a traffic or voice channel, where the mobile user is charged by the wireless system carrier for airtime. Further, switching the call from the control channel to the traffic channel also occupies system capacity that could otherwise be available for other calls.

The present invention is direct toward overcoming one or more of the above-mentioned problems.

SUMMARY OF THE INVENTION

A method of handling an incoming call during an operational mode of a wireless communications device is provided. With the operational mode activated, an incoming call is received at the wireless communications device on a control channel of the wireless communications system. The source of the incoming call is identified, typically by caller ID circuitry resident within the wireless communications device to identify a phone number of the source of the incoming call. One of a plurality of pre-recorded messages is then selected to play back to the source of the incoming call. The plurality of pre-recorded messages are personal to the user of the wireless communications device and are stored at a voice message mailbox in the wireless communications system allocated to the wireless communications device. The incoming call is then diverted to the voice message mailbox of the wireless communications device and the selected pre-recorded message is played back for the source of the incoming call.

In one form of the present invention, the step of diverting the incoming call to the voice message mailbox of the wireless communications device typically includes transmitting an identification of the selected pre-recorded message to the wireless communications system on the control channel. The incoming call is then directed to the voice message mailbox of the wireless communications device and the selected pre-recorded message is played back for the source of the incoming call.

In another form of the present invention, the step of transmitting an identification of the selected pre-recorded message to the wireless communications system on the control channel includes transmitting a registration frame to a local base station in the wireless communications system The registration frame is transmitted on the control channel and includes a plurality of bits identifying the selected pre-recorded message.

Selection of the selected pre-recorded message may be performed manually by the user of the wireless communications device. The user may view the identified source of the incoming call, identified via the caller ID circuitry, and then depress keys on a keypad included on the wireless communications device to identify which of the plurality of pre-recorded messages to play back for the caller. For example, if the user wants to play back the second pre-recorded message for the caller, he or she will depress "*2" on the keypad; for the third pre-recorded message, "*3" is depressed; and so on. Other manual methods apply as well, such as a GUI interface, to select the 1-n messages.

Selection of the pre-recorded message may also be performed automatically by the wireless communications device upon receipt of the incoming call. In this form of the present invention, the wireless communications device includes a phone book having stored phone numbers input by, and personal to, the user of the mobile communications device. The stored phone numbers are associated with the plurality of pre-recorded messages based on the user's preference of which pre-recorded message he or she wants played back for a particular person if they should call. The identified phone number, identified via the caller ID circuitry, is compared with the stored phone numbers. If a match is found, the incoming call is automatically diverted to the voice message mailbox of the wireless communications device and the pre-recorded message associated with the matched stored phone number is played back for the caller of the incoming call.

If the identified phone number, identified via the caller ID circuitry, does not match any of the stored phone numbers in the phone book, the incoming call is automatically diverted to the voice message mailbox of the wireless communications device and a default pre-recorded message is played back for the caller of the incoming call. Similarly, if the identified phone number matches one of the stored phone numbers, but the user has failed to associate a desired pre-recorded message with the matched stored phone number, the incoming call is automatically diverted to the voice message mailbox of the wireless communications device and the default pre-recorded message is played back for the caller of the incoming call.

The operational mode of the wireless communications device typically defines an unavailable mode in which the user of the wireless communications device is not receiving incoming calls. It may be that the user is in a meeting where receiving incoming calls would be awkward or inappropriate, or is otherwise busy and does not want to be disturbed. It may also be that the user simply does not want to receive calls at that particular time, either generally or from specific individuals. However, the user may still wish to provide these individuals with personalized messages. In yet another form of the present invention, the unavailable mode may be activated either automatically through pre-programming the mobile communications device, or manually by the user of the wireless communications device. Deactivation of the unavailable mode may also be accomplished either automatically or manually.

It is an object of the present invention to provide a method of handling incoming calls to a wireless communications device allowing the user the ability to provide unique messages to various individuals when the user is busy and cannot talk when paged.

It is another object of the present invention to provide a method of handling incoming calls to a wireless communications device allowing a user to manually pick one of a plurality of pre-recorded messages to play back for unique incoming calls directly by accessing the mobile keypad.

It is yet another object of the present invention to provide a method of handling incoming calls to a mobile communications device allowing a user the ability to automatically pick one of the plurality of pre-recorded messages to play for each unique incoming call by linking the pre-recorded messages to preset numbers in the user's phone book.

It is still another object of the present invention to provide a method of handling incoming calls to a wireless communications device allowing a user the ability to give unique messages to various individuals when paged without completing the call and incurring costs.

It is a further object of the present invention to provide a method of handling incoming calls to a wireless communications device allowing a user the ability to give unique messages to various individuals when paged with no, or minimal, hardware addition to the mobile communications device.

Other aspects, objects and advantages of the present invention can be obtained from the study of the application, the drawings, and the appended claims.

BRIEF DESCRIPTION OF THE DRAWINGS

FIG. 3 illustrates the storage allocation of phone book entries included in the memory of the wireless communications device shown in FIG. 1.

DETAILED DESCRIPTION OF THE INVENTION

Figure 1:
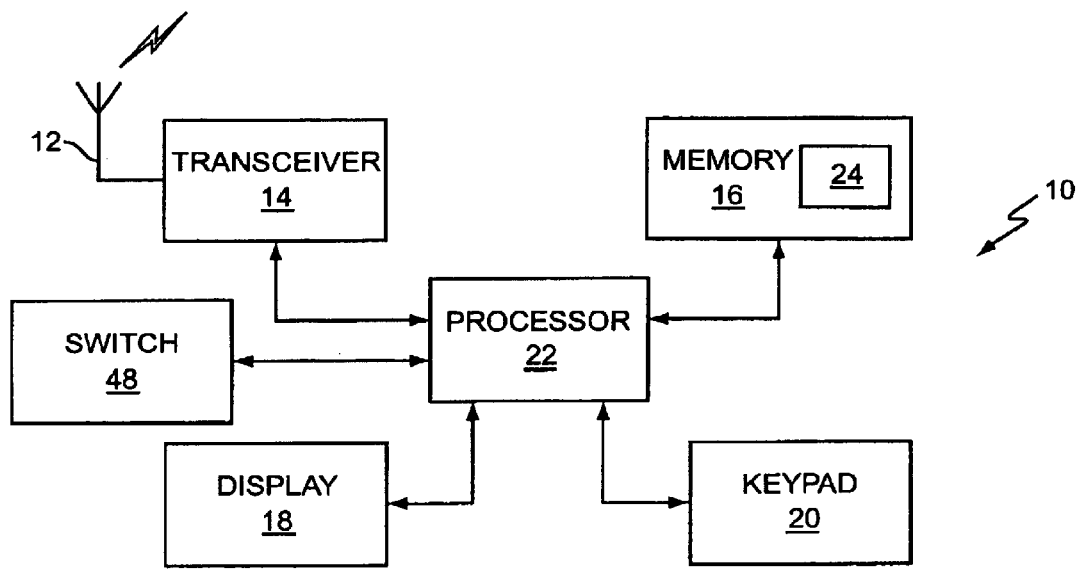
FIG. 1 is a block diagram of a wireless communications device for practicing the inventive method.

FIG. 1 illustrates a wireless, or mobile, communications device shown generally at 10 for practicing the inventive method. The wireless communications device 10 includes, among other components, an antenna 12, a transceiver 14, a memory 16, a display 18, a keypad 20 and a processor 22. The processor 22 is connected to the transceiver 14 for controlling the receipt and transmission of wireless communications signals via the antenna 12. The processor 22 is connected to the memory 16 for controlling the flow of data to and from the memory 16. The memory 16 may include a Read Only Memory (ROM) and a Random Access Memory (RAM) (not shown) for storing operating systems and software applications, such as, but not limited to, conventional caller ID circuitry. The memory 16 may also include other conventional storage devices for storing databases and the like. The processor 22 is also connected to the display 18 for controlling the images thereon, and to the keypad 20 for interfacing with the user of the wireless communications device 10. While not specifically shown in FIG. 1, the display 18 may also include a Graphical User Interface (GUI) in which the user of the wireless communications device 10 may interface therewith via the GUI. The memory 16 includes storage space allocated for a user-defined phone book 24. The phone book 24 includes phone numbers stored by the user of the wireless communications device 10 which are typically personal to the user. The phone numbers stored in the phone book 24 may be accessed by the user for speed dial or other conventional calling purposes.

Figure 2:
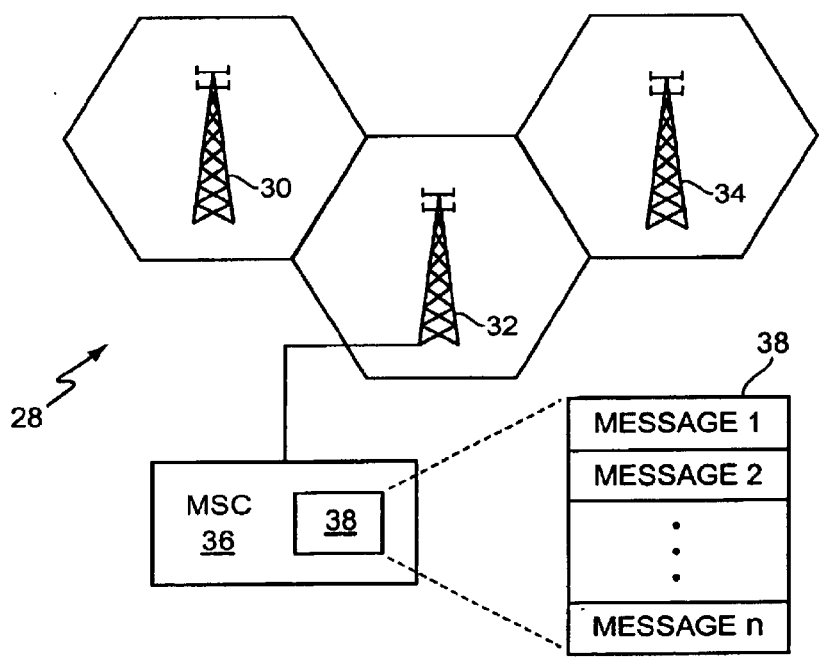
FIG. 2 illustrates a wireless communications system supporting the inventive method.

The wireless communications device 10 will include additional components (not shown) depending upon the type of wireless communications devise implementing the present inventive method. The inventive method may be implemented with virtually any type of wireless communications device, including, but not limited to, analog and digital cellular phones, pagers, wireless phone handsets, wireless communicators, personal computers and laptops equipped with wireless modems, Personal Digital Assistants (PDAs), Handheld Personal Computers (HPCs), and other wireless electronic devices. Any additional components will correspond with the functions and features offered by the above-identified devices FIG. 2 illustrates a wireless communications system, such as a cellular network, shown generally at 28, in which the wireless communications device 10 may be operational. The wireless communications system 28 includes base stations 30, 32 and 34, each having a respective cellular range. Each of the base stations 30, 32 and 34 connects to a mobile system controller (MSC) 36. The mobile system controller 36 includes a voice message mailbox 38 configured for storing a plurality of user-defined voice messages in accordance with the present inventive method. The voice message mailbox 38 is used to store voice mail messages for those wireless communications devices having MSC 36 as their home system. For simplicity, it will be assumed herein that the home system of the wireless communications device 10 is MSC 36.

A user of the wireless communications device 10 may utilize the wireless communications device 10 to store a plurality of unique messages in the voice message mailbox 38 of the MSC 36. For example, the user would access the standard voice messaging system provided by the carrier (Bell South, Pac Bell, etc.) and record his or her messages in the voice message mailbox 38 of the carrier's voice messaging system. The user may record messages by starting at message 1, then proceeding to message 2, and so on, or may manually select the message locations at which they wish to record via the keypad 20. Each of the messages 1-n stored in the voice message mailbox 38 may be a message unique to a particular person, or group of persons, which the user of the wireless communications device 10 desires that particular person, or persons, to hear when the user is unavailable to take an incoming call. Any of the messages 1-n may be set as a "default" message.

In addition to storing the messages 1-n in the voice message mailbox 38, the user can also identify within the phone book 24 which particular message 1-n should be played back for particular phone numbers stored in the phone book 24. FIG. 3 illustrates the storage allocation included within the phone book 24 in the memory 16 of the wireless communications device 10. The phone book 24 includes a plurality of user-defined fields utilized by a user of the wireless communications device 10 for storing personal phone book information. For convenience, the user-defined fields are divided into columns, with each column field labeled at the top. The phone book 24 includes a phone number field 40 for storing phone numbers personal to the user of the wireless communications device 10. The phone book 24 also includes an alpha identifier field 42 for alphanumeric tagging of the stored phone numbers. A message field 44 is provided in the phone book 24 where the user may associate a stored phone number with a particular pre-recorded message stored in the voice message mailbox 38 at the MSC 36. Thus, the user can create a plurality of personalized phone book records 46a, 46b, . . . , 46n, and can choose which pre-recorded message he or she would like played back to a particular individual if that particular individual should call when the user is unavailable.

For example, as shown in FIG. 3, and referring to phone book record 46a, should Dave Jones at phone number 555-555-1212 call while the wireless communications device 10 is in an unavailable mode, the user has specified that message 2 be played back for Dave Jones. Similarly, and referring to phone book record 46b, if John Doe at phone number 555-555-2121 should call while the wireless communications device 10 is in an unavailable mode, message 1 would be played back for John Doe. As shown in FIG. 3, and referring to phone book record 46n, no message is specified for Bill Smith at phone number 555-555-1111. Thus, if a call should be received from this number while the wireless communications device 10 is in an unavailable mode, a default message will be played back for Bill Smith. Also, the default message will be played back for incoming calls not identified by a phone number in the phone book 24, unless otherwise directed manually by the user.

Referring back to FIG. 1, in order to place the wireless communications device 10 in an unavailable mode, the wireless communications device 10 includes a switch 48 connected to the processor 22. The switch 48 may include any of the conventional switching devices normally associated with wireless communications devices, and will typically include two positions; ON and OFF. With the switch 48 in the ON position, the wireless communications device 10 receives and transmits calls in a normal working manner. Incoming calls are accepted by the mobile communications device 10, which typically alerts a user of an incoming call by ringing or flashing a light.

With the switch 48 in the OFF position, the wireless communications device 10 neither receives nor transmits calls. Incoming calls are not accepted by the mobile communications device 10, and no notification is provided to the user of any incoming calls. All incoming calls are conventionally directed to voice mail and a default message is played back for the callers. The present inventive method will work with the switch 48 in the ON position only.

With the switch 48 in the ON position, the present inventive method may be implemented in either manual or automatic modes of operation. In the manual mode of operation, the user will manually select which of the plurality of pre-recorded messages 1-n to play back to an incoming caller. In the manual mode, the user will be notified of an incoming call by the wireless communications device 10 either ringing or flashing a light. Conventional caller ID circuitry displays the phone number of the incoming call, and the user then selects which of the plurality of pre-recorded messages 1-n they want played back for that particular caller.

In the automatic, or unavailable, mode of operation, the user will typically not want to be bothered by incoming calls, but still desires personalized messages to be played back for particular callers. If a call is received while in the automatic mode of operation, the wireless communications device 10 automatically identifies the phone number of the incoming call, via conventional caller ID circuitry, and compares the identified phone number with phone numbers stored in the phone book 24. If a match is found, the incoming call is automatically directed to the voice message mailbox 38 and the particular message which the user has previously associated with that particular phone number is played back for the caller. In the automatic mode of operation, the user may or may not be notified of an incoming call.

Activation and deactivation of the automatic mode of operation may be performed manually by the user of the wireless communication device 10 by simply depressing keys on the keypad 20 to turn the automatic, or unavailable, mode of operation on or off. Alternately, activation and deactivation of the automatic mode of operation may be accomplished automatically via conventional calendar/to do list profiling software, provided, however, that the particular wireless communications device 10 incorporating the present inventive method supports such software applications.

Figure 4:
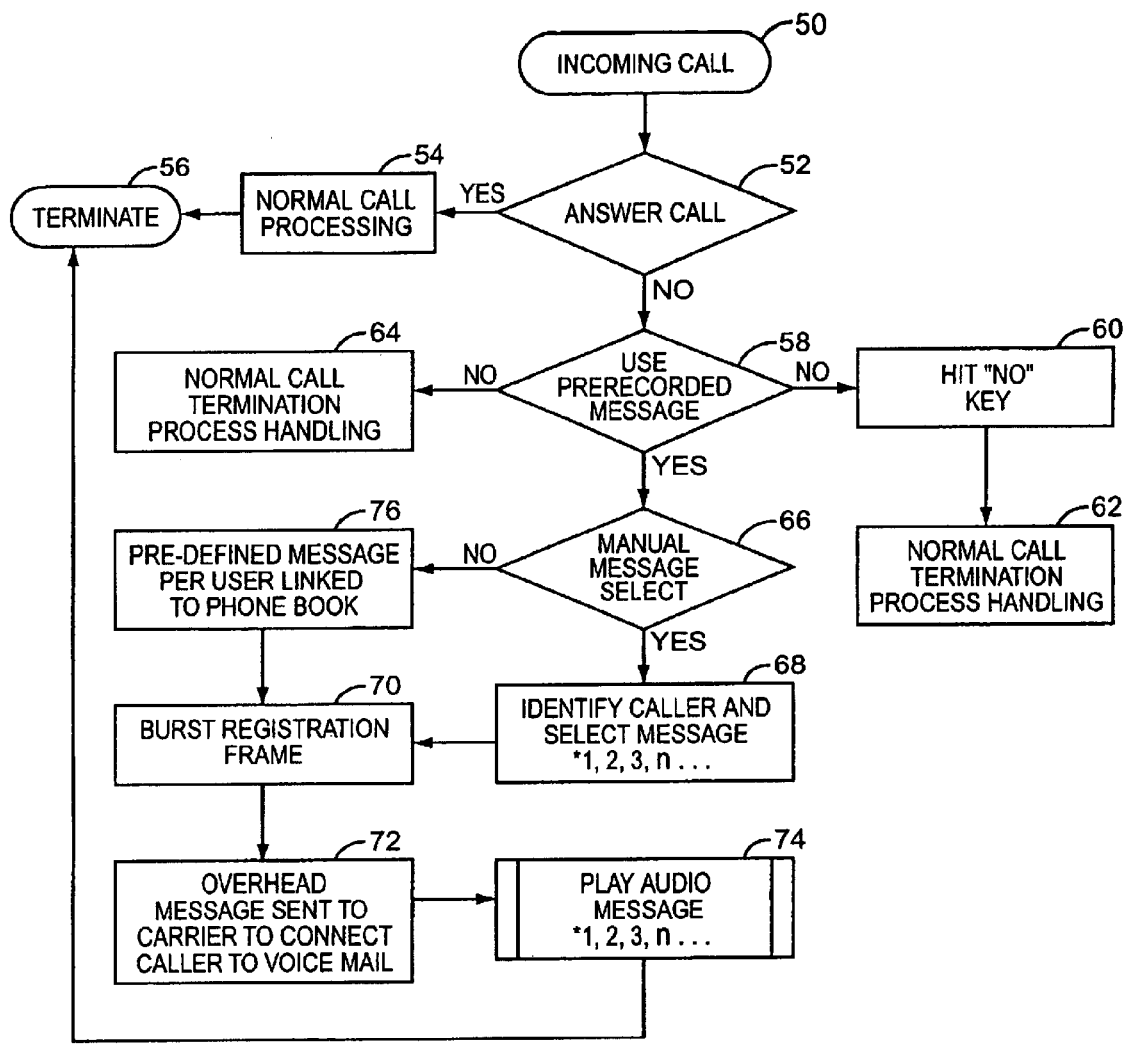
FIG. 4 is a flow diagram illustrating the handling of an incoming call at the wireless communications device according to the inventive method.

In order to better understand how the handling of incoming calls is accomplished, FIG. 4 is a flow chart illustrating the various steps undertaken when a call is received at the wireless communications device 10. The flow chart of FIG. 4 presumes that the wireless communications device is operationally configured to receive incoming calls, i.e, the switch 48 is in the ON position. As shown in FIG. 4, an incoming call is received by the wireless communications device 10 at block 50, with the user typically notified by either a ringing sound or a flashing light. Incoming calls are received on a control channel of the wireless communications system 28. If the user answers the call at block 52, the call is processed normally at block 54, and then conventionally terminated at block 56. If the call is not answered (the answer at block 52 is no), the process next determines whether the pre-recorded message on demand feature of the present invention is to be utilized at block 58. This can be accomplished in a number of different ways.

If the user hits the "NO" key at block 60 (the answer at block 58 is no), the call is conventionally terminated at block 62. More specifically, at block 62, the call will be conventionally routed to the voice message mailbox 38 for the wireless communications device 10, where a system message or a default message will be played back for the caller of the incoming call. If the user does not respond to the incoming call (the answer at block 58 is again no), the call is conventionally terminated at block 64 in the same manner as previously described with respect to block 62.

If the answer at block 58 is yes, meaning that the pre-recorded message on demand feature of the present invention is to be utilized, the process next determines whether the pre-recorded message on demand feature is to be accomplished manually or automatically at block 66, i.e., whether the automatic mode of operation is activated or deactivated. If the automatic mode of operation is deactivated, the answer at block 66 will be yes meaning that the user has manually initiated the pre-recorded message on demand feature at block 58. Such manual initiation will have been accomplished by the wireless communications device 10 identifying the source of the incoming call via conventional caller ID circuitry, displaying the phone number to the user on the display 18, and then by the user selecting which pre-recorded message 1-n he or she wants played back for that particular caller at block 68. The message is selected at block 68 by the user depressing the star (*) button on the keypad 20 and then the number of the message he or she desires to be played back for the caller. However, other selection methods may be implemented without departing from the spirit and scope of the present invention. The wireless communications device 10 will then burst a registration frame (RFR) to a local base station at block 70. The RFR is transmitted on the control channel and contains all of the typical user-required information and, according to the present inventive method, contains bits of information defining which pre-recorded message 1-n to play. The RFR is sent to the system carrier which connects the caller the voice message mailbox 38 of the wireless communications device 10 at block 72, and plays back the selected message at block 74. The RFR will also terminate the paging of the mobile device (phone stops ringing). The call is then conventionally terminated at block 56.

By identifying which of the pre-recorded messages to play back via the control channel at block 70, the inventive method has the distinct advantage of incurring no costs to the user of the wireless communications device 10. The wireless communications system 28 is informed of which pre-recorded message 1-n to play back to a caller via the RFR transmitted on the control channel, and thus does not have to complete the call and switch the wireless communications device 10 to a traffic channel for the user to be able to direct the incoming call. This not only saves the wireless user money since they are not charged for airtime, but also frees-up system capacity that may be used for other calls.

If the answer at block 66 is no, this means that the automatic mode of operation is activated, which thus initiated the pre-recorded message on demand feature at block 58. The incoming source of the incoming call is identified via conventional caller ID circuitry, and the phone number of the incoming call is compared with the phone numbers stored in the phone number field 40 of the phone book 24 at block 76. If a match is found, the wireless communications device 10 then bursts an RFR to a local base station, at block 70, containing information bits identifying the particular message in the message field 44 associated with the matched stored phone number determined at block 76. The RFR is then sent to the carrier on the control channel which connects the incoming call to the voice message mailbox 38 of the wireless communications device 10 at block 72, and plays back the selected message for the caller at block 74. The call is then conventionally terminated at block 56. If the phone number of the incoming call does not match any of the phone numbers stored in the phone number field 40 of the phone book 24, or if there is no associated message identified for a matched stored phone number (see phone book record 46n), the RFR transmitted to the local base station at block 70 contains information bits identifying the default message to play back to the caller of the incoming call. While the user may still be notified of an incoming call in the automatic mode of operation, the automatic processing and handling of the incoming call typically occurs so quickly that the user will not have time to answer the call before the wireless communications device 10 bursts the RFR to the local base station at block 70.

The present invention allows wireless, or mobile, communications device users to take advantage of 1 of the n pre-recorded messages in the mobile phone carrier's voice message mailbox. When a call is received, the mobile user can then select any of the n pre-recorded messages to play back to the caller in real time. This gives a tremendous advantage to the mobile user to tailor their response to individual callers, verses having one "canned" voice mail message played to all callers.

The inventive method has particular utility for business travelers who are often engaged in meetings and other activities during which they are unavailable. As an example, if a mobile user is in an off-sight meeting and receives a call from his or her spouse, they may wish to tell their spouse that the next break from the meeting is at, for example, 10:00 am and that any call will be return ed at that time. One of the pre-recorded messages may be utilized to inform the mobile user's spouse of this information. Also, should one of the mobile user's employees call, the mobile user may want a message sent to that employee, a group of employees, or all employees, to inform them that a certain person is in charge for that day or other period of time, and to contact that person with any questions. Another desired message may be that if a vendor calls, the mobile user would like the vendor to be given the message that he or she is off-sight today and to please call back tomorrow. The pre-recorded messages 1-n can thus be tailored to suit a particular mobile user's needs at any given time.

The present invention may be incorporated for use with a variety of different wireless communication protocols, including, but not limited to, CDMA (Code Division Multiple Access), TDMA (Time Division Multiple Access), GSM (Global System for Mobile Communications), as well as other wireless communications protocols. Also, a mobile device implementing the inventive method need not be located in its home area in order for the inventive method to be operable. When the wireless communications device 10 is turned on, it will register with the system identifying the owner and the cell in which the device is currently residing. As the device 10 moves from cell to cell, it will conventionally be handed-off from one cell to another, and during this hand-off the home system will track which cell the device 10 currently resides in.

Thus, referring to FIG. 2, if the wireless communications device 10 is in the cell range of base station 34, it will be registered in that cell. When its home system, MSC 36, receives a call for the wireless communications device 10, it will page the wireless communications device 10 in the cell in which it is currently registered, namely in the cell range of base station 34. Paging typically occurs on the control channel with an overhead message. While all mobiles in the cell will receive this overhead message, only the mobile that matches its identity will indicate an incoming call. When the wireless communications device 10 rings, or is otherwise notified that it has an incoming call, the present inventive method may be activated either manually or automatically as previously described.

While the present invention has been described with the particular reference to the drawings, is should be understood that various modifications could be made without departing from the spirit and scope of the present invention.

I claim:

1. A method of handling an incoming call for a wireless communications device, said method comprising:
   receiving an incoming call at the wireless communications device over a control channel of a wireless communications system;
   selecting, at the wireless communications device, one of a plurality of pre-recorded messages to play back to a caller of the incoming call, wherein the plurality of pre-recorded messages are stored at a voice message mailbox in the wireless communications system; and
   transmitting to a base station an identification of the selected pre-recorded message to the wireless communications system over the control channel, the identification comprising a plurality of bits in a registration frame that identifies the selected pre-recorded message to be played back to the caller.

2. The method of claim 1, wherein the selected pre-recorded message is selected manually by a user of the wireless communications device.

3. The method of claim 2, wherein the manual selection is accomplished by depressing keys on a keypad included on the wireless communications device to identify the selected pre-recorded message.

4. The method of claim 1, further comprising:
   identifying a source of the incoming call, wherein selection of the pre-recorded message is based on the identified source.

5. The method of claim 1, further comprising:
   storing, in a phone book on the wireless communications device, one or more phone numbers associated with the plurality of pre-recorded messages;
   identifying a phone number of a source of the incoming call;
   comparing the identified phone number with the one or more phone numbers stored in the phone book; and
   if the identified phone number matches one of the stored phone numbers transmitting an identification of the pre-recorded message associated with the matched stored phone number to the wireless communications system on the control channel as the selected pre-recorded message.

6. The method of claim 5, further comprising the step of:
   if the identified phone number does not match any of the stored phone numbers,
      transmitting an identification of a default pre-recorded message to the wireless communications system on the control channel as the selected pre-recorded message.

7. The method of claim 5, further comprising the step of:
   if the matched stored phone number does not have an associated pre-recorded message,
      transmitting an identification of a default pre-recorded message to the wireless communications system on the control channel as the selected pre-recorded message.

8. A method of handling an incoming call during an operational mode of a wireless communications device, said method comprising:
   with the operational mode activated, receiving an incoming call at the wireless communications device over a control channel of a wireless communications system;
   identifying a source of the incoming call;
   selecting, at the wireless communications device, one of a plurality of pre-recorded messages to play back to the source of the incoming call based on th identified source, wherein the plurality of pre-recorded messages stored at a voice message mailbox in the wireless communications system;
   transmitting to a base station an identification of the selected pre-recorded message to the wireless communications system over the control channel, the identification comprising a plurality of bits in a registration frame that identifies the selected pre-recorded message to be played back to the source of the incoming call; and
   diverting the incoming call to the voice message mailbox of the wireless communications device, wherein the selected pre-recorded message is played back for the source of the incoming call.

9. The method of claim 8, wherein selection of the elected pre-recorded message and transmission of the identification of the selected pre-recorded message are performed automatically by the wireless communications device upon receipt of the incoming call.

10. The method of claim 8, wherein the selected pre-recorded message is selected manually by a user of the wireless communications device.

11. The method of claim 10, wherein the manual selection is accomplished by depressing keys on a keypad included on the wireless communications device to identify the selected pre-recorded message.

12. The method of claim 8, wherein the identifying step includes activating caller ID circuitry in the wireless communications device to identify a phone number of he source of the incoming call.

13. The method of claim 12 further comprising:
   storing, in a phone book on the wireless communications device, one or more phone numbers associated with the plurality of pre-recorded messages;

comparing the identified phone number with the stored phone numbers in the phone book; and if the identified phone number matches one of the stored phone numbers, diverting the incoming call to the voice message mailbox of the wireless communications device, wherein the pre-recorded message associated with the matched store phone number is played back for the source of the incoming call as the selected pre-recorded message.

14. The method of claim 13, further comprising the step of:

if the identified phone number does not match any of the stored phone numbers, diverting the incoming call to the voice message mailbox of the wireless communications device, wherein a default pre-recorded message is played back for the source of the incoming call as the selected pre-recorded message.

15. The method of claim 8, wherein the operational mode of the wireless communications device comprises an unavailable mode in which a user of the wireless communications device is not receiving incoming calls, wherein the unavailable mode is activated automatically or manually by the user of the wireless communications device.

16. The method of claim 8, wherein the plurality of pre-recorded messages stored at the voice message mailbox in the wireless communications system are recorded by a user of the mobile communications device.

* * * * *